United States Patent [19]
Scarpino et al.

[11] 3,723,805
[45] Mar. 27, 1973

[54] DISTORTION CORRECTION SYSTEM

[75] Inventors: Theodore J. Scarpino; Douglas W. Holbrook, both of Endwell, N.Y.

[73] Assignee: The United States of America as represented by the Secretary of the Navy

[22] Filed: May 12, 1971

[21] Appl. No.: 142,706

[52] U.S. Cl. ................................315/27 GD, 315/24
[51] Int. Cl. ..............................................H01j 29/80
[58] Field of Search .......178/6.8, 7.85, 7.88; 315/23, 315/24, 27 GD

[56] References Cited

UNITED STATES PATENTS

| | | | |
|---|---|---|---|
| 3,274,545 | 9/1966 | Bowles et al. | 178/7.88 UX |
| 3,422,304 | 1/1969 | Thorpe | 315/18 |
| 3,465,137 | 9/1969 | Brouillette, Jr. et al. | 315/24 X |
| 3,547,522 | 12/1970 | Schaefer | 178/7.85 |
| 3,549,803 | 12/1970 | Becht et al. | 178/7.88 |
| 3,614,314 | 10/1971 | Rossire | 178/7.88 |
| 3,620,592 | 11/1971 | Freeman | 178/7.88 X |

*Primary Examiner*—Leland A. Sebastian
*Attorney*—R. S. Sciascia, Henry Hansen and Gilbert H. Hennessey

[57] ABSTRACT

Combinational distortion correction in a cathode ray tube (CRT) head-up display is accomplished for both optical distortion and CRT distortion by electronically predistorting the displays that appear on the face of the CRT. The corrections are performed in one step by the implementation of a complete mathematical model describing the combinational distortion patterns. The corrections to the vertical and horizontal CRT deflection voltages are represented as combinations of a plurality of transformation functions which are electronically mechanized by a straight line segment approximation technique where the slope and segment lengths are controlled by diode segment generators.

4 Claims, 7 Drawing Figures

INVENTORS
THEODORE J. SCARPINO
DOUGLAS W. HOLBROOK
BY Gilbert H. Hennessey
Henry Hansen
ATTORNEYS INVENTORS
THEODORE. J. SCARPINO
DOUGLAS W. HOLBROOK
BY Gilbert H. Hennessey
Henry Hansen
ATTORNEYS INVENTORS
THEODORE J. SCARPINO
DOUGLAS W. HOLBROOK
BY Gilbert H. Hennessey
Henry Hudson
ATTORNEYS INVENTORS
THEODORE J. SCARPINO
DOUGLAS W. HOLBROOK
BY
Gilbert H. Hennessey
Henry Hansen
ATTORNEYS

DISTORTION CORRECTION SYSTEM

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

The invention relates generally to the field of cathode ray tubes (CRT) combined with optical systems, and more particularly, to improved distortion correction systems for optical CRT displays. Ordinary cathode ray tubes, including those used for television, typically exhibit a type of geometrical display error known as pin-cushion distortion. For example, in the uncorrected display of a large square, the sides usually appear slightly concave to an observer. To compensate for pin-cushion distortion, various types of correction circuits have been utilized to suitably modify the CRT deflection voltages. In the case of television where a raster scan is employed, simple resistive capacitive networks have been used to correct for distortion at the edges of the screen. The function of CRT correction circuits has always been to present an undistorted display on the screen.

In conventional optical systems optical distortion is corrected by adding corrective optical elements. Recently cathode ray tubes have been combined with optical apparatus to project the CRT image for various purposes. For example, television images can be magnified and projected by optical means. In the past, however, the distortion contributed by the optical portion of the system was corrected optically, that is, by adding or modifying optical components such as lenses and curved mirrors. The object was to project an undistorted image of an undistorted CRT display.

A special problem has arisen in the current development of collimated viewing systems, termed head-up displays, which enable aircraft pilots, for example, to simultaneously view a CRT display and a distant scene, such as the horizon or a runway. Light rays from a CRT image produced in the cockpit are made parallel, that is, collimated, by an optical system which partially reflects the collimated image back to the pilot along his normal line of sight so that the image is readable with the eye focused at "infinity." This arrangement also completely eliminates parallax. Thus the CRT image actually appears to be superimposed directly on a distant scene. But optical collimation of the CRT image usually produces distortion, which can be very pronounced at the limits of the field of view.

Designers sought to deal with this distortion problem in the conventional manner. In most cases it was true that the distortion could be practically eliminated by including a few more specially designed corrective optical elements. This solution had several drawbacks, however. Space and weight are critical to aircraft applications and the necessary field of view required large, heavy optical elements throughout the system. Moreover, as the number of elements was multiplied, the amount of light reaching the observer from the CRT was reduced by absorption. In view of the high background brightness outside, the reduction in received CRT image brightness proved to be quite serious. Operating the CRT at higher intensity, of course, shortens the screen lifetime and degrades the resolution of displayed images.

SUMMARY OF THE INVENTION

Accordingly the general purpose of the invention is to correct by nonoptical means distortion produced in viewing systems employing optical elements to project a CRT image. Another object of the invention is to compensate simultaneously for both electronic and optical distortion in optical CRT systems. A further object of the invention is to eliminate the effect of combinational distortion in optical CRT systems without degrading the brightness of the display. Still another object of the invention is to compensate for optical and electronic errors in a CRT image projection system without increasing substantially the size or weight of the apparatus.

These and other objects of the invention are achieved and the limitations of the prior art overcome by predistorting the deflection voltages to the CRT in accordance with a derived mathematical model of the combined distortion due to optical and CRT errors. The correction produces an apparently distorted image on the face of the CRT. The corrections to the vertical and horizontal deflection voltages are represented as combinations of a plurality of transformation functions which are electronically mechanized by a straight line segment approximation technique where the slope and segment lengths are controlled by compensated diode segment generators.

DESCRIPTION OF THE PREFERRED EMBODIMENTS

Figure 1:
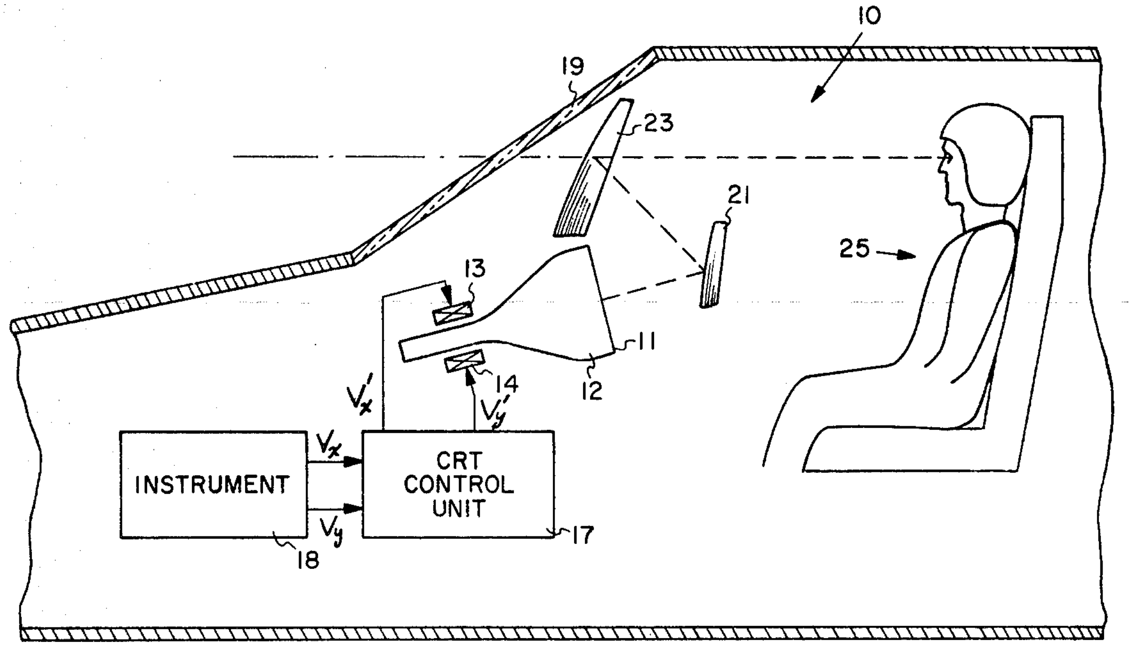
FIG. 1 is a schematic and block diagram of a typical cockpit arrangement of a collimated viewing system including a CRT distortion control unit according to the invention.

Referring now to FIG. 1 of the drawings, the pertinent features of an aircraft cockpit are shown generally at 10 to illustrate the use of the distortion correction system in connection with a specific type of reflective optical system known as a head-up display. The optical portion of the display forms the subject matter of a copending application, Ser. No. 142,707, filed May 12, 1971, by Frithiof Johnson, entitled "Collimated Viewing System", now U.S. Pat. No. 3,697,154. The specific nature of the optical system producing distortion is, of course, directly related to the distortion correction apparatus. At the forward end of cockpit 10, a standard CRT 12 is positioned having a flat phosphor screen 11 and typical vertical and horizontal deflection yokes 13 and 14. To provide a caligraphic or discrete symbol display, as contrasted with a raster scan, an instrument 18 provides vertical and horizontal deflection signals, $V_y'$ and $V_x'$, to yokes 13 and 14 via CRT distortion control unit 17. For example, an electronically simulated attitude indicator could be displayed on screen 11 to indicate changes in the aircraft's orientation. The image on screen 11 is reflected from an aspheric mirror 21 to a partially reflective aspheric combiner 23 located in front of the cockpit windshield 19. CRT 12, mirror 21 and combiner 23 are arranged such that a pilot seated at 25 can simultaneously view the reflected CRT image and the outside world transmitted through windshield 19 and combiner 23. CRT screen 11, mirror 21 and combiner 23 are designed to collimate the light rays from screen 11 so that the image produced by CRT 12 appears to be coming from infinity as light from a distant source would. In carrying out the primary function of collimation, elements 21 and 23 inevitably introduce some degree of distortion. Generally this distortion is greatest near the limits of the field of view. Distortion control unit 17 modifies the instantaneous values of the vertical and horizontal deflection voltages produced by instrument 18 to correct for typical pin-cushion distortion, hereinafter referred to as CRT distortion, due to standard CRT geometry. At the same time unit 17 predistorts the actual display appearing on screen 11 to compensate beforehand for the errors which will be introduced by the combined action of mirror 21 and combiner 23 in reflecting the image to the pilot.

Figure 3:
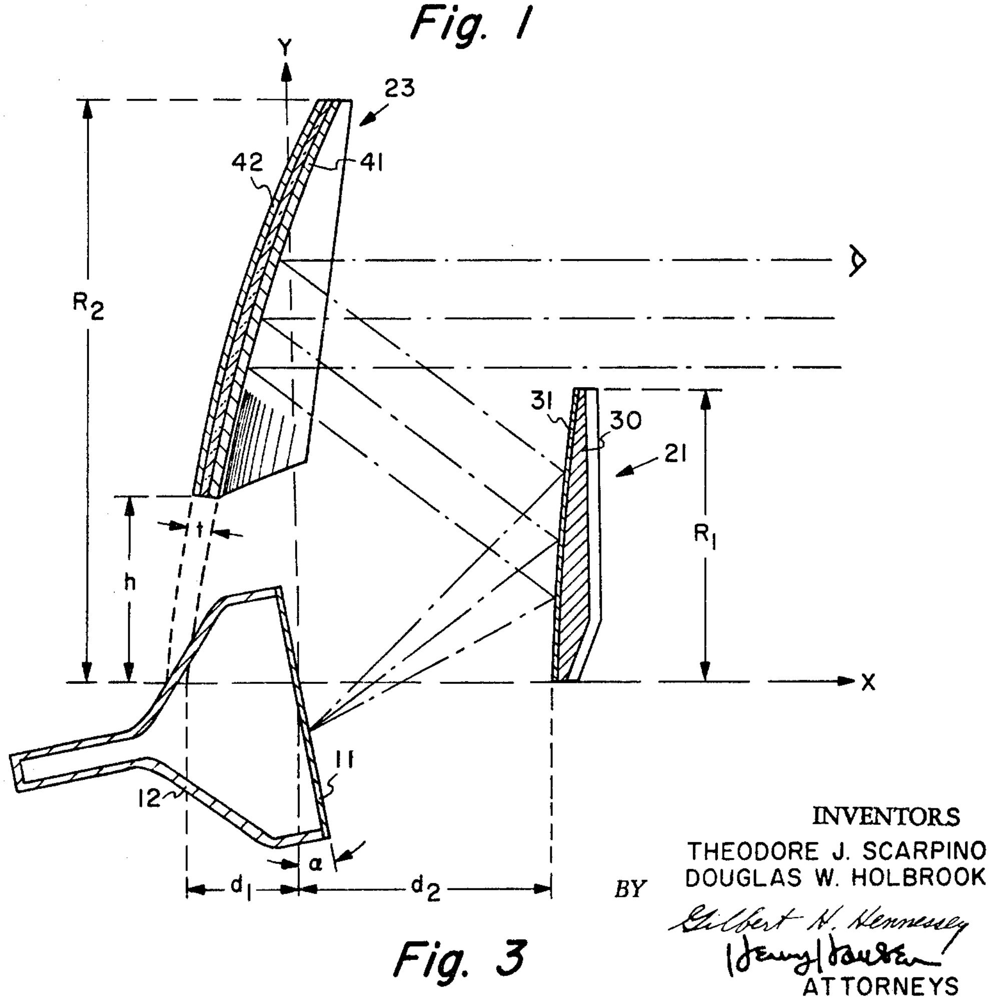
FIG. 3 is a cross-sectional view of the optical elements taken along line 3—3 in the direction of the arrows in FIG. 2.
Figure 2:
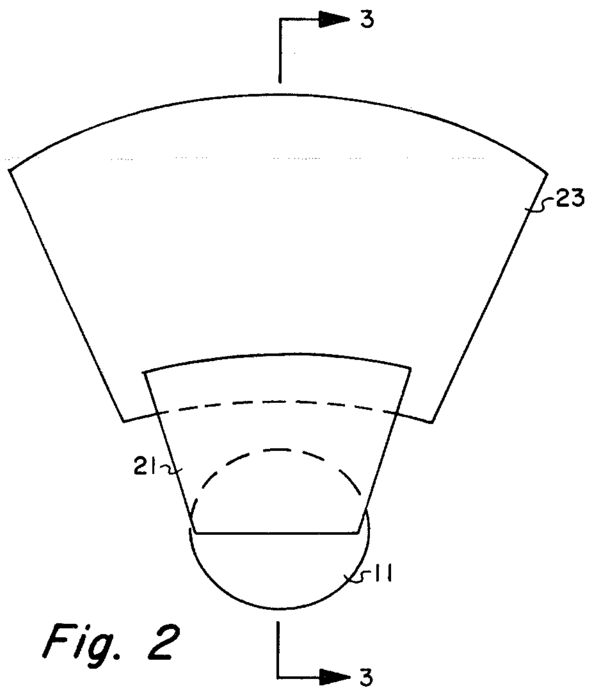
FIG. 2 is a plan view of the optical elements of the viewing system of FIG. 1 from the observer's side.

With respect to the vertical and horizontal reference axes, dashed lines $x$ and $y$ in FIG. 3, screen 11 is mounted on the x-axis perpendicular to the $x$–$y$ plane and tilted slightly counterclockwise from the vertical by an angle $\alpha$ made with the y-axis. Mirror 21 may comprise a solid, opaque body portion 30 provided with a front surface having a totally reflective coating 31. Surface 31 is a general aspheric surface of revolution about the x-axis. The front and back surfaces of combiner 23 are formed from different curves. Surface 41 is a hyperboloid, a surface of revolution about the x-axis, having a partially reflective coating of a suitable material, such as aluminum. The back surface 42 of combiner 23 is a coaxial hyperboloid, having different dimensions, coated with a hard anti-reflection material, such as magnesium fluoride, to force transmission of CRT image rays which pass unreflected through surface 41 and real world rays which could otherwise be reflected rather than transmitted by surface 42. The body of combiner 23 between surfaces 41 and 42 may be formed from a transparent material such as glass or clear plastic. A portion of height $h$ above the x-axis is excluded from the cut section of combiner 23 because it would normally be obscured from view by mirror 21.

A typical optical system had the following specifications given below in Table I with reference to FIG. 3:

TABLE I

Surface 41, $x = (1.5106448y^2 + 26.57099^2)^{1/2} - 26.57099$;

Surface 42, $x = (1.5065y^2 + 26.6082^2)^{1/2} - 26.6082$;

Surface 31, $x = -0.00342035y + 0.0418094y^2 - 0.00761052y^3 + 0.000468966y^4$;

Screen 11, plane surface with $\alpha = 11°-½°$ tilt, center at $x = 0, y = 0$, useful diameter 5.25;

$R_1 = 4.8$; $R_2 = 9.5$; $h = 3$; $t = 0.26$; $d_1 = 1.70224$; $d_2 = 4.34565$;

Reflectivity of surface 41 = 25%;

typical central eye position of observer, $x = 25$, $y = 7.0$; where all indicated dimensions are in inches.

It should be noted that in the embodiment shown in FIG. 3 surface 42 is designed with respect to transmission of images from a distant scene. The curves for surfaces 41 and 42 differ slightly to prevent distortion of the transmitted light from the outside world.

Figure 4:
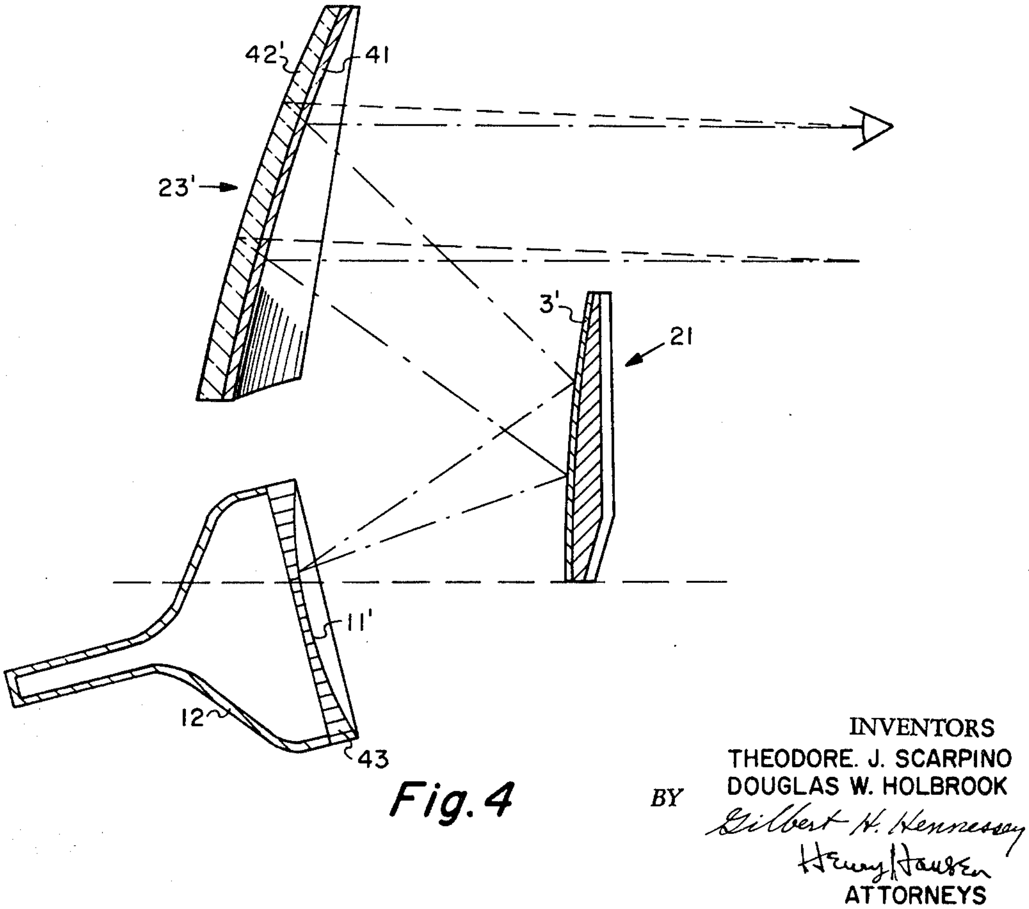
FIG. 4 is a cross-sectional view of a collimated viewing system illustrating certain modifications to the arrangement of FIG. 3.

In FIG. 4 two independent variations of the optical system are shown, either or both of which could be included in the design of FIG. 3. By altering the curve of surface 42, a surface 42' can be generated which will superimpose reflected CRT rays on those reflected from the coated surface 41. Although the accurate transmission of real world images must be compromised to a small extent, the principal advantage of designing surface 42' to superimposed CRT reflections is that the anti-reflection coating may be omitted reducing cost and providing increased ruggedness of the system.

The ideal surface, that is the calculated curvature, for the screen of CRT 12 is a sphere of radius 6.75 inches in the design specified above. If in FIG. 3 screen 11 were replaced by screen 11', its equation in the specific example above would be $$(x - 6.70)^2 + (y - 0.835)^2 = (6.75)^2,$$

the sphere's geometric center being located at $x = 6.70$ inches, $y = 0.835$ inches. A spherical surface such as 11' can be provided by using a fiber optic face plate 43 ground to the desired contour. Since such face plates add considerably to the weight and cost of the CRT, the use of a standard flat screen 11, as in FIG. 3, was investigated as an approximation of the ideal surface 11' and found to be acceptable since negligible additional distortion was introduced. The criticality of the exact curvature of screen 11' was far less than that of surfaces 31 and 41 due to the overall design of the system.

A specific CRT distortion control unit will now be described to illustrate the invention as applied to the optical system of FIG. 3 specified in Table I. The particular system described below is of course designed for a CRT of specific dimensions. In particular the CRT must have a flat screen with a useful diameter of about 5.25 inches and a central writing radius, or deflection radius of the electron beam, of about 6.32 inches providing a maximum deflection angle of about 45°.

Figure 5:
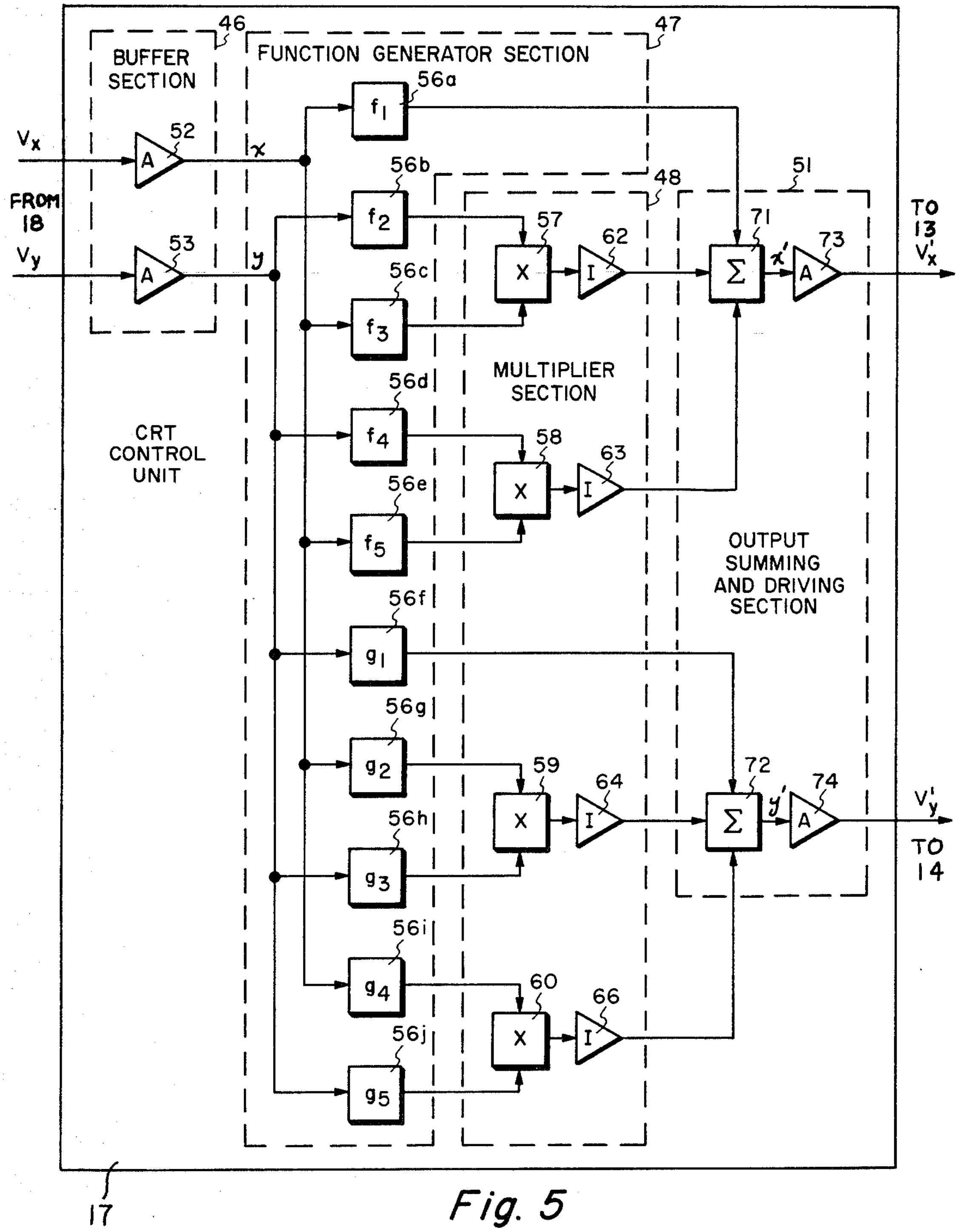
FIG. 5 is a block diagram of a typical embodiment of the CRT control unit of FIG. 1.

Referring now to FIG. 5, CRT control unit 17 receives the outputs of instrument 18, $V_x$ and $V_y$. The internal components of unit 17 operate as an analog computer to transform these deflection signals to new values, $V_x'$ and $V_y'$, which are applied to the corresponding deflection yokes of CRT 12. $V_x$ and $V_y$ initially pass through a buffer section 46 via buffer amplifiers 52 and 53 respectively whose separate outputs are fed to a function generation section 47 containing a set of ten function generators 56a through 56j. The output $x$ of amplifier 52 representing the horizontal deflection signal is passed in parallel to function generators 56a, 56c, 56e, 56g and 56i. The output $y$ of amplifier 53 representing the vertical deflection signal is passed in parallel to the remaining function generators in section 47. Generators 56 provide outputs $f_1$ through $f_5$ and $g_1$ through $g_5$ as functions of their input voltages $x$ and $y$ in accordance with Tables II and III below:

TABLE II $$f_1 = a_1 + a_2x + a_3x^3 + a_4x^5 + a_5x^7$$
$$f_2 = a_{12}y + a_{13}y^3$$
$$f_3 = a_6x + a_7x^3 + a_8x^5$$
$$f_4 = a_{14}y^2$$
$$f_5 = a_9x + a_{10}x^3 + a_{11}x^5$$
$$g_1 = b_1 + b_2y + b_3y^2 + b_4y^3 + b_5y^4$$
$$g_2 = b_{13}x^2$$
$$g_3 = b_6 + b_7y + b_8y^2 + b_9y^3$$
$$g_4 = b_{14}x^4$$
$$g_5 = b_{10} + b_{11}y + b_{12}y^3$$

TABLE III

| | Value of Coefficient $a_i$ | Value of Coefficient $b_i$ |
|---|---|---|
| 1 | 0 | $2.75077 \times 10^{-3}$ |
| 2 | $5.33341 \times 10^{-1}$ | $4.93809 \times 10^{-1}$ |
| 3 | $-9.46014 \times 10^{-4}$ | $-8.96195 \times 10^{-3}$ |
| 4 | $4.0804 \times 10^{-6}$ | $1.29855 \times 10^{-4}$ |
| 5 | $-1.39243 \times 10^{-8}$ | $1.53767 \times 10^{-5}$ |
| 6 | $9.98584 \times 10^{-2}$ | $3.44385 \times 10^{-1}$ |
| 7 | $-1.01666 \times 10^{-3}$ | $1.23108 \times 10^{-2}$ |
| 8 | $4.21849 \times 10^{-6}$ | $-3.56838 \times 10^{-3}$ |
| 9 | $3.3053 \times 10^{-2}$ | $4.40363 \times 10^{-4}$ |
| 10 | $1.03292 \times 10^{-4}$ | $1.34908 \times 10^{-1}$ |
| 11 | $-4.64149 \times 10^{-7}$ | $-7.04614 \times 10^{-3}$ |
| 12 | $1.0 \times 10^{-1}$ | $-9.04451 \times 10^{-4}$ |
| 13 | $-5.67 \times 10^{-4}$ | $1.0 \times 10^{-2}$ |
| 14 | $1.0 \times 10^{-2}$ | $1.0 \times 10^{-4}$ |

Figure 6:
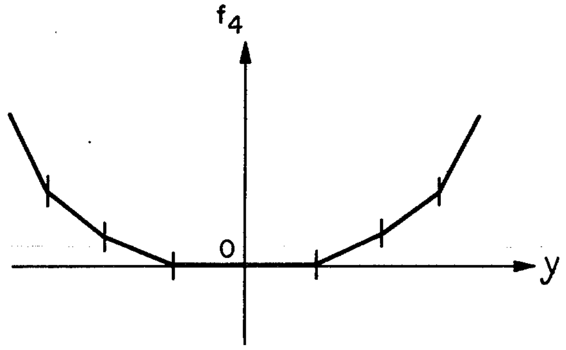
FIG. 6 is a graph showing the relation between input and output voltage for a typical function generator of FIG. 5.

The outputs of generators 56 are provided by means of straight line segment approximation. For example, $f_4$ is a quadratic function of $y$ which can be approximated by straight line segments of varying length and slope as in FIG. 6. It should be noted that $g_2$ yields an identical curve to that of $f_4$.

Figure 7:
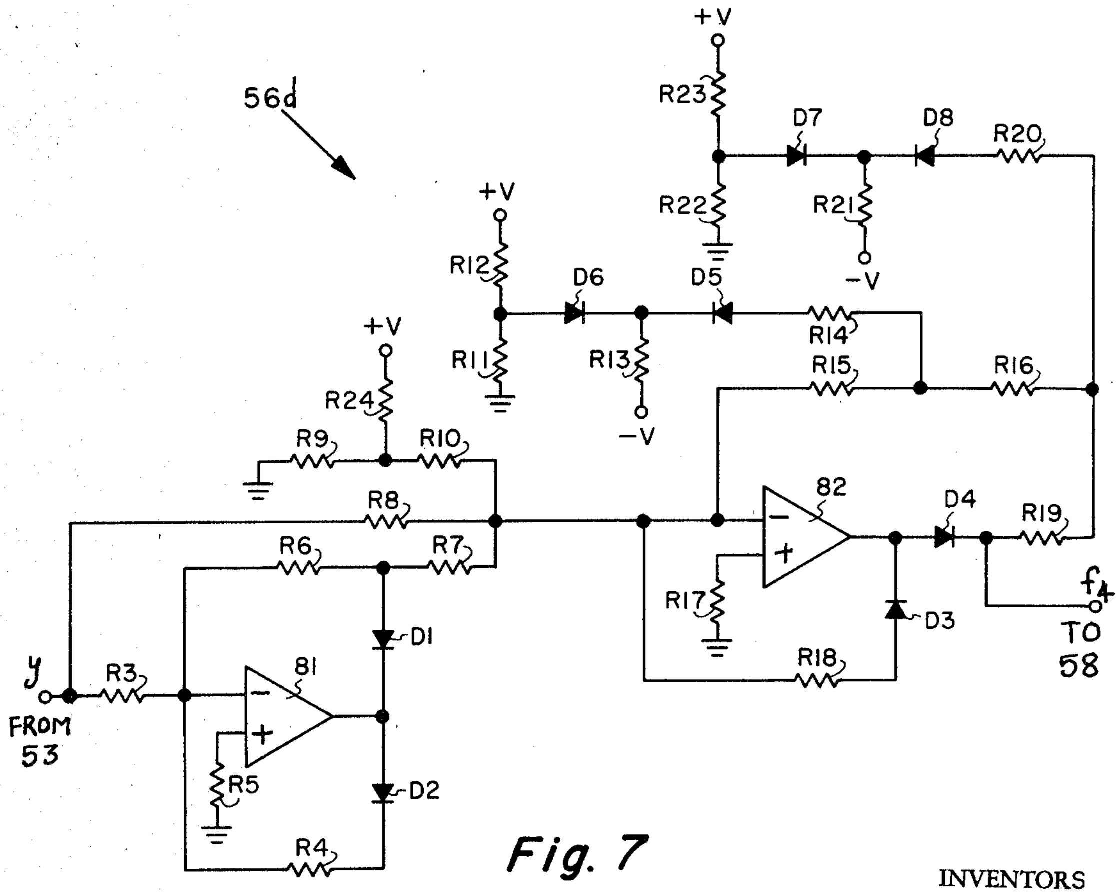
FIG. 7 is a schematic and block diagram of a typical function generator of FIG. 5.

Each function $f_1$ through $f_5$ and $g_1$ through $g_5$ is mechanized by a segment generator circuit. A typical segment generator using diode control is shown in FIG. 7 for the quadratic function $f_4$ (FIG. 6) produced by generator 56*d* (FIG. 5). The input signal is applied via resistor $R_3$ to a negative input of an operational amplifier 81 whose positive input side is grounded through resistor $R_5$. The output of amplifier 81 is fed to two parallel feedback loops one containing diode $D_2$ and resistor $R_4$ in series and the other containing diode $D_1$ and resistor $R_6$ in series. The junction of resistor $R_6$ and diode $D_1$ is connected through a suitable resistive network to a source of positive voltage. Amplifier 81 and its associated diode pair $D_1$ and $D_2$ provide an absolute value function segment which is unipolar and therefore independent of or symmetrical with respect to the polarity of the input signal $y$ from amplifier 53 (FIG. 5). The input voltage is also connected via a resistor $R_8$ to a second operational amplifier 82 having a similar pair of feedback loops for producing a second unipolar output segment. Amplifier 82 is different in one respect however from amplifier 81. One of the feedback loops for amplifier 82 contains a plurality of resistors $R_{19}$, $R_{16}$ and $R_{15}$ all in series with a diode $D_4$. A pair of opposed diodes $D_5$ and $D_6$ with appropriate resistive networks and voltage supplies is connected to the junction between resistors $R_{15}$ and $R_{16}$. A second opposed diode pair containing diodes $D_7$ and $D_8$ with similar biasing is connected to the junction between resistors $R_{16}$ and $R_{19}$. The opposed diode pairs furnish the remaining two segments on either side of the curve of FIG. 6 by providing amplifier 82 with different gain for two different ranges of the $x$ input. The output representing function $f_4$ is taken at the junction of diode $D_4$ and resistor $R_{19}$.

Referring again to FIG. 7 a typical diode segment generator constructed according to the invention had the following resistance values given below in Table IV in kilohm units.

TABLE IV

| Resistor $R_i$ | Value(kΩ) | Resistor $R_i$ | Value(kΩ) |
|---|---|---|---|
| 3 | 49.9 | 13 | 10.5 |
| 4 | 10 | 14 | 2.55 |
| 5 | 24.9 | 15 | 20 |
| 6 | 49.9 | 16 | 3.01 |
| 7 | 49.9 | 17 | 12.4 |
| 8 | 100 | 18 | 23.1 |
| 9 | 1.1 | 19 | 1.02 |
| 10 | 100 | 20 | .365 |
| 11 | 0.357 | 21 | 11.3 |
| 12 | 4.64 | 22 | 1.13 |
| | | 23 | 3.83 |
| | | 24 | 13.7 |

Any compatible set of matched diodes and high performance operational amplifiers can be used for diodes $D_1$ through $D_8$ and amplifiers 81 and 82 respectively. Fairchild operational amplifier μA741 has been found to be satisfactory for amplifiers 81 and 82.

Those familiar with the fundamentals of analog computer design will recognize that the equation for $f_4$ in Table I, or, for that matter, any of the functions, can be implemented by other means than diode segment generators. The segment generator mechanization of function $f_4$ is preferred however, because of its simplicity. The remaining functions can be implemented in a similar manner to that of functions $f_4$ and $g_2$. That is, the smooth curve represented by the polynomial function in Table II for any generator 56 can be approximated by a straight line segment curve implemented by a suitable diode-resistive network as illustrated in FIG. 7. The function $g_4$ can be generated by a circuit fundamentally identical to that shown in FIG. 7 since $g_4$ is quadratic in nature.

Referring again to FIG. 5 the outputs of function generators 56 are combined according to the following mathematical expressions $$x' = f_1 + f_2f_3 + f_4f_5, \quad (1)$$

$$y' = g_1 + g_2g_3 + g_4g_5 \quad (2)$$

where $f_1$, $f_3$, $f_5$, $g_2$ and $g_4$ are functions of the $x$ or horizontal input and $f_2$, $f_4$, $g_1$, $g_3$ and $g_5$ are functions of the $y$ or vertical input to the system. Accordingly the outputs of function generators 56*b* and 56*c* for functions $f_2$ and $f_3$ are multiplied in multiplier 57 and passed via inverter 62 to a summer 71. Likewise the outputs of function generators 56*d* and 56*e* for functions $f_4$ and $f_5$ are multiplied in multiplier 58 and passed via an inverter 63 to summer 71. The output of function generator 56*a* for $f_1$ is passed directly to summer 71 whose output representing the sum of its inputs is passed to a suitable deflection amplifier 73 providing output $V_x'$ to the horizontal deflection yoke of CRT 12.

The vertical deflection voltage $V_y'$ is obtained in a similar manner. The outputs $g_2$ and $g_3$ of function generators 56*g* and 56*h* are multiplied in multiplier 59 and passed to another summer 72 via an inverter 64. Functions $g_4$ and $g_5$ from generators 56*i* and 56*j* are multiplied in a multiplier 60 and passed to summer 72 via inverter 66. Like function $f_1$, function $g_1$ from generator 56*f* is fed directly to summer 72 whose input is passed via a suitable deflection amplifier 74 to drive the vertical deflection yoke of CRT 12. Inverters 62, 63, 64 and 66 can be eliminated if multipliers 57, 58, 59 and 60 are noninverting.

In operation, referring again to FIG. 1, a symbol, for example, generated by instrument 18 by means of suitable vertical and horizontal deflection signals is displayed in distorted fashion on screen 11 via distortion control unit 17. The image appearing on screen 11 is distorted in a predetermined manner so that the image when viewed in its collimated form reflected from combiner 23 appears to be distortion free. Therefore CRT control unit 17 is said to "predistort" the display. The effect is to compensate simultaneously for errors from different sources occurring at two completely different stages of image projection, that is, electronic and optical.

The procedure under which the equations in Tables I and II and equations (1) and (2) were derived can be applied to any cathode ray tube optical viewing system to correct for both pin-cushion distortion and optical distortion. The equations of Table I and the manner in which they are combined as shown in equations (1) and (2) are generalized at least with respect to two element reflective systems where the cathode ray tube has a substantially flat screen.

The generalized procedure applies to any CRT optical system, including those utilizing conventional lens systems. The procedure involves the following three basic steps for developing a complete mathematical model describing the combinational distortion patterns from the various sources of error in the system:

1. Select a typical ray reaching the observer's eye and trace it backwards through the optical system to the point from which it would have originated on the CRT screen.
2. Relate the point on the CRT screen to the pair of vertical and horizontal deflection amplifier voltages, $V_y'$ and $V_x'$, necessary to aim the CRT beam at that point.
3. Correlate coordinates of the observed point represented by the selected ray in step 1 with a pair of input coordinates representing the identical relative position.

Thus to display an observed point which correlates with the desired input coordinates, the horizontal and vertical inputs must be transformed or changed into the deflection amplifier voltages determined in step 2. It is this transformation which is effected by CRT distortion control unit 17 of FIG. 1 and FIG. 5.

Step 1 can be implemented by well known methods of computer ray tracing for known surfaces and can be repeated for any desired number of points.

The second step of the procedure involves the geometry of the cathode ray tube. Pin-cushion distortion is caused by using a CRT screen which does not have a center of curvature located at the origin of the electron beam. If the screen were such a sphere, there would be no pin-cushion distortion. When a flat-faced CRT is used as in FIG. 3 the horizontal deflection amplifier voltage is related to the horizontal distance from the *y* axis, $d_x$, on the CRT screen surface by the following equation:

$$V_x = kd_x / \sqrt{(d_x^2 + d_y^2 + R^2)};$$

and for the vertical voltage where $d_y$ is the distance from the x-axis of the screen:

$$V_y = kd_y / \sqrt{(d_x^2 + d_y^2 + R^2)},$$

where $k$ is an amplification constant R is the writing radius or distance from the effective origin of the electron beam to the origin or center of the CRT screen. Similar equations can be developed for cathode ray tubes with screens of varying curvature.

The complete mathematical model is derived by keeping the elevation or *y* value of the observed image at a fixed level and determining the transformation for a predetermined number of *x* positions along the fixed *y* line. Then a new elevation or *y* value would be chosen and the process repeated until a sufficient number of curves had been generated. A similar procedure is used for the *x* values until a family of curves is produced representing a mathematical model giving deflection amplifier voltages $V_x'$ and $V_y'$ correctly in terms of the complete range of $V_x$ and $V_y$ inputs. Once this family of curves has been generated, explicit analytic functions can be fit to these curves using conventional least squares curve fitting methods. It is this type of analysis which led to the equations (1) and (2) and those in Table II. Since the individual procedures in each step involve well known transformation techniques, their details are omitted as they would be obvious to an opto-electronic design engineer familiar with the necessary statistical tools.

In addition to pin-cushion distortion and optical distortion, distortion related to coordinate system transformation can be handled by this technique. For example, in aircraft applications information is frequently given in the direction cosines coordinate system. Errors are introduced if these signals are displayed directly as aximuth/elevation coordinates. However, a simple mathematical relationship exists between these coordinate systems which can be added to the steps to complete the transformation.

It should be obvious that the distortion correction technique disclosed herein is applicable to raster scan type CRT's as well as nonscanned CRT's. The corrections could be generated as a function of time.

The cogent advantages of predistorting the CRT display to correct for optical distortion as well as pin-cushion distortion lie in eliminating the addition of corrective optical surfaces which absorb light, consume space and add weight to a system which already has stringent physical requirements in many applications. The correction technique permits a minimum number of optical surfaces to be used. In particular, in the head-up display application a compact optical system can be designed to perform a specific task such as collimating the rays without regard to distortion. With well known advanced techniques of computer ray tracing, an existing optical system can be simply and quickly analyzed with respect to distortion and completely described by a mathematical model. Similarly CRT geometry can easily be mathematically modeled to represent pincushion distortion, or for that matter, any type of measurable distortion capable of mathematical expression. Thus in the case of head-up displays the optical system is freed to perform the task which only it can perform, that is, collimation, while distortion correction is accomplished electronically. In size/weight limited systems this advantage is critical.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An opto-electronic system for producing a display corresponding to a set of input signals, comprising:
 - optical means with inherent optical distortion for projecting a replica of an image;
 - CRT means having inherent CRT distortion operatively aligned with said optical means for producing the image; and
 - signal conditioning means operatively connected to said CRT means and having horizontal and vertical input terminals for receiving corresponding input signals designated respectively $V_x$ and $V_y$, the input signals being corrected in accordance with a least square mathematical model describing the combined effect of CRT and optical distortion, for electronically compensating the input signals to provide a deflection output to said CRT means corrected for both CRT and optical distortion, said signal conditioning means having a first plurality of function generators operatively receiving $V_x$ and a second plurality of function generators operatively receiving $V_y$, and means for combining the outputs of said function generators according to the mathematical model to provide the corrected deflection outputs to said CRT means.

2. An opto-electronic system according to claim 1 further comprising:
 - each of said first and second plurality of function generators having a discrete line segment generator circuit.

3. An opto-electronic system according to claim 1 further comprising:
 - said first plurality of function generators including at least five generators producing outputs $f_1, f_3, f_5, g_2$ and $g_4$ respectively, said second plurality of function generators including at least five generators producing outputs $f_2, f_4, g_1, g_3$ and $g_5$ respectively, and said combining means including means for combining said function generator outputs to produce the corrected outputs to said CRT means according to the equations:

$$V_x' = f_1 + f_2 f_3 + f_4 f_5,$$

and $$V_y' = g_1 + g_2 g_3 + g_4 g_5,$$

where $V_x'$ and $V_y'$ represent the corrected deflection outputs to said CRT means.

4. An opto-electronic system according to claim 1 further comprising:
 - said function generators having means for producing respective ones of the following functions:

$$f_1 = a_1 + a_2 x + a_3 x^3 + a_4 x^5 + a_5 x^7$$
$$f_2 = a_{12} y + a_{13} y^3$$
$$f_3 = a_6 x + a_7 x^3 + a_8 x^5$$
$$f_4 = a_{14} y^2$$
$$f_5 = a_9 x + a_{10} x^3 + a_{11} x^5$$
$$g_1 = b_1 + b_2 y + b_3 y^2 + b_4 y^3 + b_5 y^4$$
$$g_2 = b_{13} x^2$$
$$g_3 = b_6 + b_7 y + b_8 y^2 + b_9 y^3$$
$$g_4 = b_{14} x^4$$
$$g_5 = b_{10} + b_{11} y + b_{12} y^3,$$

where $x$ is proportional to $V_x$ and $y$ is proportional to $V_y$, all $a_i$ and $b_i$ being constants.

* * * * *